Patented Oct. 10, 1939

2,176,010

UNITED STATES PATENT OFFICE 2,176,010

ALKYLATED HALO-PHENOLS

Lindley E. Mills, Midland, Mich., assignor to The Dow Chemical Company, Midland, Mich., a corporation of Michigan No Drawing. Application December 30, 1935, Serial No. 56,723

5 Claims. (Cl. 260—623)

The present invention regards a new class of compounds, namely certain mono- and di-halogenated mono-alkyl phenols in which the substituting alkyl group contains four or more carbon atoms. I have prepared compounds of the aforementioned class, determined certain physical properties thereof whereby they may be readily identified and found that they may be used for various purposes, for example as antiseptics, and that they have a high germicidal value, particularly against Staphylococcus aureus, E. typhi, and B. typhosus. The invention, then, consists of the new products hereinafter fully described and particularly pointed out in the claims.

The preparation of my new compounds can be accomplished by treating a mono-alkylated phenol directly with a halogen, e. g. chlorine or bromine. For example, a such phenol is placed in a closed reactor, preferably provided with an agitator, a halogen inlet, and an outlet suitable for the removal of the hydrogen halide gas formed during the course of the reaction. The phenol is heated above the melting point if the material is normally a solid, and the halogen then introduced below the surface of the liquid. A solvent for the phenol, which is not halogenated under the conditions of the reaction, may be used if desired. Among the solvents I have found suitable for use are ethylene chloride, carbon tetrachloride, benzene, etc. After the desired amount of halogen has been introduced into the reactor, the reaction product is blow with air to insure removal of any small amounts of hydrogen halide remaining therein. The desired product can then be separated from the reaction product by fractional distillation in vacuo.

In the direct halogenation of alkyl phenols, halogenating agents other than elemental chlorine and bromine may also be used, viz. sulphuryl chloride, sulphuryl bromide, etc. Among other ways in which my new class of compounds may be prepared are (1) by the condensation of a halogenated phenol with an alkyl halide in the presence of a catalyst such as zinc chloride, aluminum chloride, etc.; (2) by hydrolysis of a di- or tri-halogenated alkyl substituted benzene in the presence of a suitable catalyst, e. g. copper, cuprous oxide, etc.; (3) by diazotization of a halo-alkyl aniline and decomposition of the resulting product.

The following examples describe in detail the preparation of certain specific members of my new class of compounds but are not to be construed as limiting the invention:

Example 1.—2-chloro-4-tertiary butyl phenol

In a reactor provided with an agitator was placed 100 grams (0.667 mol) of 4-tertiary butyl phenol. The phenol was heated to and maintained at a temperature of about 65°–85° C. and chlorine was introduced slowly below the surface of the liquid compound. When 0.516 mol of hydrogen chloride had been evolved from the reaction mixture, the passage of chlorine thereinto was stopped, and the product was blown with air to remove a slight amount of hydrogen chloride remaining therein. The product was then fractionated in vacuo and 103.5 grams of 2-chloro-4-tertiary butyl phenol was obtained. This corresponds to a yield of 84 per cent of theoretical. The compound is a liquid having a specific gravity of 1.099 at 25° C./25° C., boiling at 84.5°–86° C. at 3–4 millimeters of mercury absolute pressure. The phenol coefficient of the compound against E. typhi is 13.0.

Example 2.—2-bromo-4-tertiary-amyl phenol

In the same apparatus as used in the above experiment, was placed 200 grams (1.22 mol) of 4-tertiary amyl phenol which was heated to and maintained at a temperature of about 90°–95° C. 195.2 grams (1.22 mol.) of liquid bromine was introduced slowly below the surface of the heated phenol. After all of the bromine had been introduced, the reaction product was blow with air, and then fractionally distilled in vacuo. In this manner 221.0 grams of 2-bromo-4-tertiary amyl phenol was obtained, corresponding to 74.5 per cent of theoretical yield. Upon analysis, the theoretical precentage of halogen, i. e. 32.9 percent by weight, was found in the compound. The compound is a liquid having a specific gravity of 1.308 at 25° C./25° C., boiling at 119°–120° C. at 6–7 millimeters of mercury pressure absolute. The phenol coefficient of this compound is 8.0 against E. typhi.

Example 3.—2,6-dibromo-4-tertiary octyl phenol

In the preparation of this compound I treated 348 grams (1.22 mols) of 2-bromo-4-tertiary octyl phenol, at a temperature of 80°–100° C., with 195 grams (1.22 mols) of bromine. The yield of dibromo compound was 324.5 grams or 73 per cent of theoretical. The boiling point of this compound is 158°–163 C. at 3–6 millimeters of mercury pressure absolute. The specific gravity of the material is 1.455 at 25° C./25° C. Analysis for percentage of bromine showed 44.29 per cent present as compared with a theoretical percentage of 44.00. The phenol coefficient of the compound is 8.0 against E. typhi.

Example 4.—2-chloro-4-normal hexyl phenol

I have treated 51.7 grams (0.294 mol) of 4-normal-hexyl phenol, dissolved in 200 grams of ethylene chloride, with chlorine at a temperature of 25°–30° C. until 0.3 mol of hydrogen chloride was evolved. The solution containing the reaction product was then fractionally distilled whereby 48.3 grams (0.228 mol) of a 2-chloro-4-normal hexyl phenol product was obtained. 2-chloro-4-normal-hexyl phenol is a viscous liquid having a boiling point of 143°–146° C. at 8 to 10 millimeters of mercury pressure absolute, and a specific gravity 1.053 at 20° C./20° C. Analysis of the compound for chlorine gave 16.68 per cent thereof, which is the theoretical percentage.

*Example 5.—2,6-dichloro-4-normal hexyl phenol*

24.0 grams (0.114 mol) of 2-chloro-4-normal hexyl phenol was dissolved in 100 grams of ethylene chloride and chlorinated to the dichloro-compound over a period of one hour and 25 minutes at a temperature of 25°–30° C. The phenolic solution was then fractionally distilled under reduced pressure to obtain 23.3 grams (0.095 mol) of 2,6-dichloro-4-normal hexyl phenol. This compound is a straw-colored viscous liquid having a boiling point of 154° C. at 5 millimeters of mercury pressure absolute, and a specific gravity of 1.157 at 20° C/20° C. Analysis of the compound for chlorine gave 28.79 per cent of halogen, which is very close to the theoretical percentage of 28.71.

*Example 6.—2-bromo-4-normal octyl phenol*

40 grams (0.194 mol) of 4-normal octyl phenol was dissolved in 120 grams of ethylene dichloride. 31 grams (0.194 mol) of bromine was dissolved in 80 grams of ethylene chloride and this solution slowly dropped onto the surface of the agitated phenol solution over a period of 1.25 hours and at a temperature of 25°–30° C. The reaction product was then fractionally distilled, whereby 51.5 grams (0.181 mol) of a 2-bromo-4-normal octyl phenol product was obtained. This phenol derivative is a straw-colored viscous liquid at ordinary temperatures, boiling at 172°–173° C. at 11 millimeters of mercury pressure absolute, having a freezing point of 0° C., and a specific gravity 1.195 at 20°/20° C. Analysis for bromine showed an actual percentage thereof of 28.00 per cent, which corresponds closely to the theoretical percentage of 28.03.

*Example 7.—2,4-dibromo-6-normal octyl phenol*

In the preparation of this compound I dissolved 30 grams (0.145 mol) of 6-normal octyl phenol in 90 grams of ethylene chloride and added thereto 46.5 grams (0.29 mol) of bromine. This addition was made at a substantially uniform rate over a period of 2.25 hours at temperatures ranging from 25°–35° C. The yield of dibromo compound was 49.5 grams (0.136 mol), or 94.3 per cent of theoretical. 2,4-dibromo-6-normal octyl phenol is a crystalline solid having a boiling point of 190°–192° C. at 7 millimeters of mercury pressure absolute, a melting point of 28° C., and a density 1.422 at 20° C./20° C. Analysis for percentage of bromine showed 43.8 per cent present, as compared with a theoretical percentage of 43.91.

The phenol coefficients of my new compounds were determined by the method developed by the United States Public Health Service, Hygienic Laboratory, Circular No. 198 of the Food and Drug Administration, United States Department of Agriculture, and are based upon a coefficient of 1.0 for pure phenol.

Other compounds within the scope of this invention can be prepared wherein the substituted alkyl groups and the halogen are in different relative positions, e. g. 3,5-dichloro-4-tertiary butyl phenol, 2-normal hexyl 5-bromo phenol, 2,4-dibromo-5-tertiary amyl phenol, etc. I have also found that other alkyl phenols than those described in the specific examples can be halogenated directly to obtain compounds falling within my new class of halo-substituted alkyl phenols. Phenol substituted with secondary- and iso-alkyl groupings also yields halogenated products of the class here described, e. g. 2-bromo-4-secondary butyl phenol, 2,4-dichloro-6-iso-butyl phenol, 2,6-dibromo-4-secondary-amyl phenol, 2-chloro-4-secondary heptyl phenol, 4-bromo-3-secondary-butyl phenol, 2-chloro-6-secondary amyl phenol.

This application is a continuation-in-part of my prior application Serial Number 750,598.

Other modes of applying the principle of my invention may be employed instead of the one explained, change being made as regards the materials employed, provided the products claimed in the following claims be thereby obtained.

I therefore particularly point out and distinctly claim as my invention:

1. A 4-alkyl di-bromo-phenol wherein the substituting alkyl group contains at least 5 carbon atoms.

2. A new product consisting of a 4-alkyl-phenol containing more than five carbon atoms in the alkyl group and halogen substituents in the 2:6 positions.

3. An alkylated dibromo-phenol wherein the substituting alkyl group contains at least 5 carbon atoms.

4. An alkylated dibromo-phenol wherein the substituting alkyl group contains between 5 and 8 carbon atoms inclusive.

5. A 4-alkyl-dibromo-phenol wherein the substituting alkyl group contains between 5 and 8 carbon atoms inclusive.

LINDLEY E. MILLS.